Feb. 13, 1962 — H. RIEPE ET AL — 3,020,884
WRITING IMPLEMENT WITH A REPLACEABLE FLUID-HOLDING CARTRIDGE
Filed Nov. 18, 1958

INVENTORS.
HELMUTH RIEPE
HERMANN FRITZ KAISER
BY
ATTORNEY

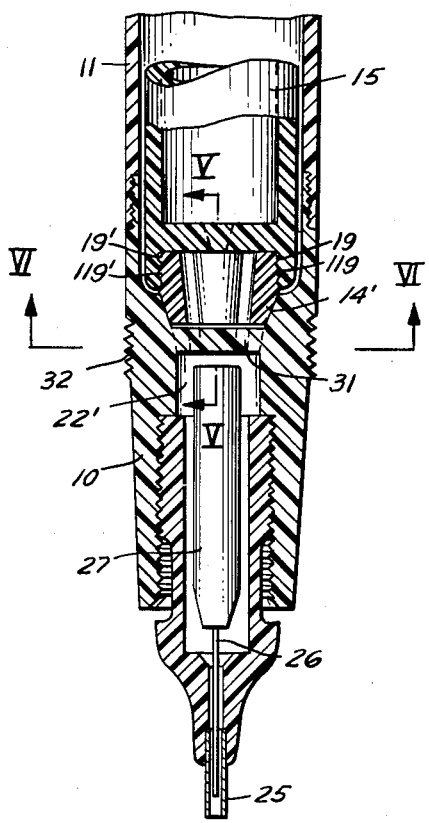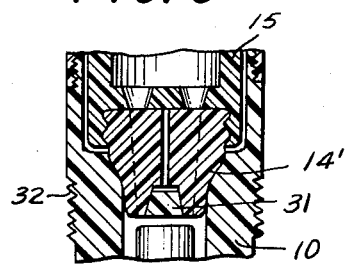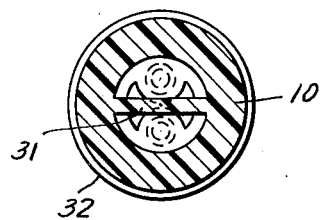

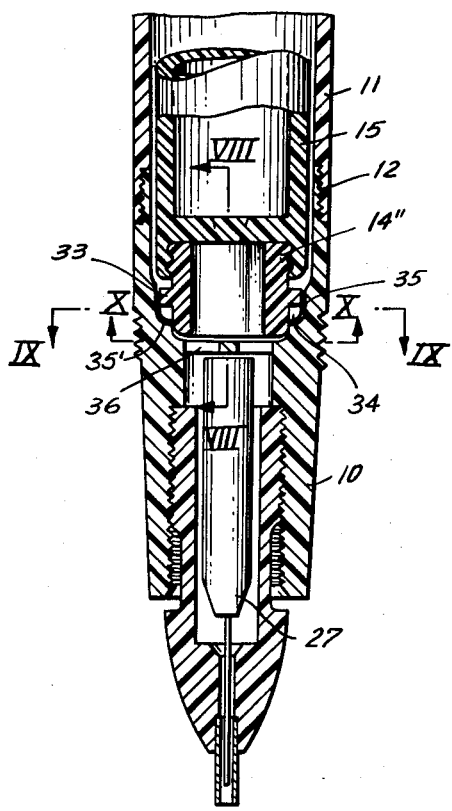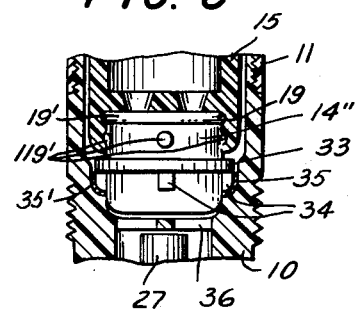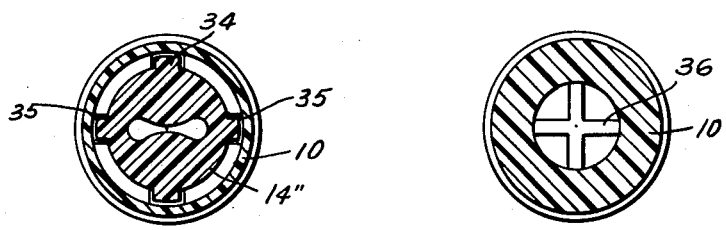

Feb. 13, 1962 H. RIEPE ET AL 3,020,884
WRITING IMPLEMENT WITH A REPLACEABLE FLUID-HOLDING CARTRIDGE
Filed Nov. 18, 1958 5 Sheets-Sheet 4
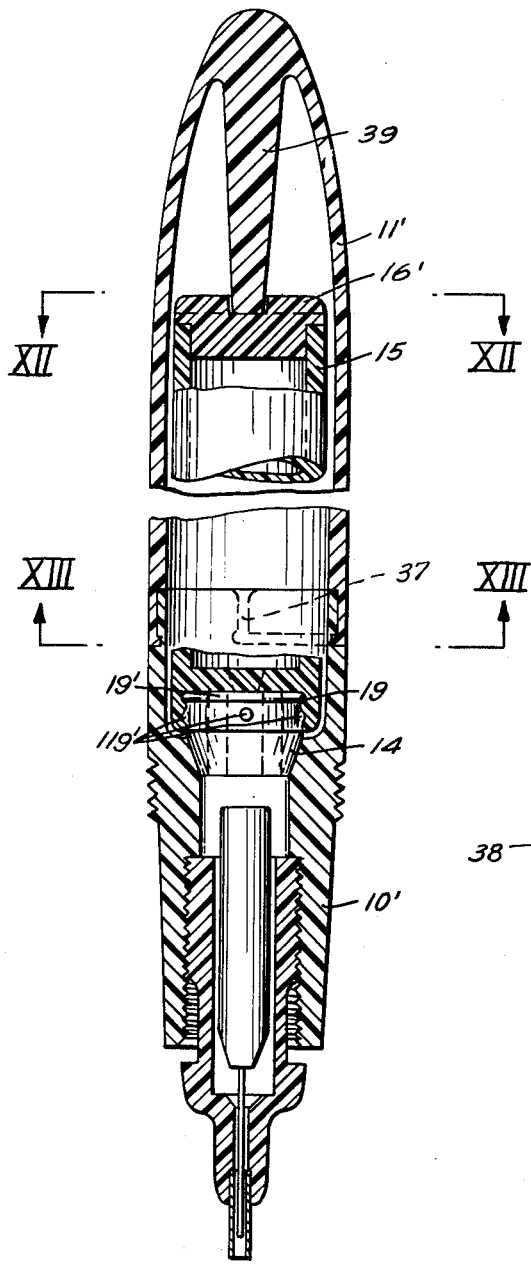
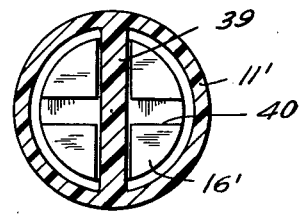
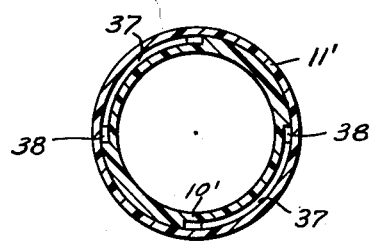
INVENTORS.
HELMUTH RIEPE
HERMANN FRITZ KAISER
BY
ATTORNEY

INVENTORS.
HELMUTH RIEPE
HERMANN FRITZ KAISER

ATTORNEY

United States Patent Office 3,020,884
Patented Feb. 13, 1962

3,020,884
WRITING IMPLEMENT WITH A REPLACEABLE FLUID-HOLDING CARTRIDGE
Helmuth Riepe and Hermann Fritz Kaiser, Hamburg, Germany, assignors to L. & C. Hardtmuth, Inc., Bloomsbury, N.J., a corporation of New Jersey
Filed Nov. 18, 1958, Ser. No. 774,627
11 Claims. (Cl. 120—44)

This invention relates generally to writing implements of the fountain pen type and especially deals with a writing implement provided with an exchangeable fluid-holding cartridge provided with an operative closure or valve governing the release of fluid matter from the cartridge, the latter being adapted to hold any desired writing fluid, such as differently colored ink, India ink, etc.

Fountain pens with exchangeable fluid-holding cartridges are known in the art. Fountain pens with exchangeable cartridges are usually so constructed that when the cartridge is placed into the holder of the writing implement, the cartridge is pierced and permits fluid to be supplied to the writing instrumentality carried by the holder. When the cartridge should be removed, the pierced portion of such cartridge usually is made to self-seal. However, in most devices of this kind the cartridge is retained in a holder until the contents of the cartridge is exhausted, whereupon a new cartridge is replaced instead. Such procedure is preferable since a secure sealing of the pierced aperture first made in the cartridge cannot be depended upon.

There exist other types of cartridge-carrying fountain pens similar to that disclosed in Patent No. 2,126,540. However, most of the cartridge-holding pens either lack utility or are impractical as to their intended functions, such as insecurely fastening replaceable cartridges in the fountain pen barrel, causing pen leakage or ineffectually sealing a cartridge, when the latter is being replaced.

This invention is intended to overcome the various shortcomings of heretofore developed devices of the type indicated and constitute a marked advancement in the art.

In the present development the cartridge employed in the writing implement is not only removable, but is provided with a positively operative closure which controls the supply of fluid to the writing instrumentality of the implement. Such closure is designed to prevent escape of fluid held within the cartridge when the latter is intended to be removed prior to becoming empty. Thus an exchange of cartridges, either filled, partly filled or empty, can take place without fear of liquid matter leaving the cartridge during the exchange operation or its removal from the writing implement. This feature alone facilitates a ready exchange of cartridges containing ink of different colors, India ink and any other fluid writing matter.

Moreover, the present invention contemplates the operation of the cartridge closure, that is its opening or closing, while the cartridge is within the writing implement, such operation being effected by a slight rotary movement of one of two cooperating barrel components constituting the barrel of the implement.

The prime objects of this invention are the provisions of a writing implement including two interlockable hollow barrel components which can be readily separated, and which writing implement has within its hollow portion an exchangeable and replaceable fluid-carrying cartridge provided with an operative closure, and which closure is adapted to be actuated by the movement of one of the barrel components, and wherein said cartridge is composed of what are termed as fixed and mobile elements, the latter element being the fluid-carrying element, the fixed element being the fluid-dispensing element, and wherein said fluid-dispensing element is fixedly but removably secured within the lower or fixed barrel component, and wherein in the latter component there is provided an exchangeable and removable writing instrumentality adapted to be supplied with fluid from said cartridge when its closure is opened, and which cartridge can be removed after being closed through the rotation of the upper or mobile barrel component, whereupon the cartridge can be replaced by another cartridge with a closed closure, and which closure is to be opened for supplying fluid to said writing instrumentality.

The foregoing and still further objects and advantages of the present invention will become more fully understood from the ensuing description of the drawings, disclosing numerous preferred embodiments of the present invention, which drawings, however, are by no means intended to limit this invention to the structures shown, as they are intended to serve for explanatory purposes only, and wherein:

FIG. 4 is a fragmental vertical cross section through the lower portion of a modified form of the device, similar to that shown in FIG. 1, with some parts of its constituents shown in elevation;

FIG. 5 is a fragmental vertical section taken along lines V—V of FIG. 4;

FIG. 6 is a horizontal cross section taken approximately along lines VI—VI of FIG. 4;

FIG. 7 illustrates another modification disclosing the lower portion of the writing implement in vertical cross section;

FIG. 8 is a vertical section therethrough taken on lines VIII—VIII of FIG. 7;

FIG. 9 is a horizontal section taken along lines IX—IX of FIG. 7, illustrating the fixed positioning of the fluid-dispensing lower cartridge element in the lower barrel component of the implement;

FIG. 10 is a section taken approximately along lines X—X of FIG. 7, illustrating an abutment arrangement for the weight of a fluid guide;

FIG. 11 illustrates another modified form of the present invention in vertical cross section with a portion thereof removed and with some of its parts in elevation;

FIG. 12 is a horizontal section taken approximately along lines XII—XII of FIG. 11, illustrating an interlocking arrangement between the mobile barrel component and the mobile fluid-holding cartridge element;

FIG. 13 is a horizontal cross section taken approximately along lines XIII—XIII of FIG. 11;

Figure 1:
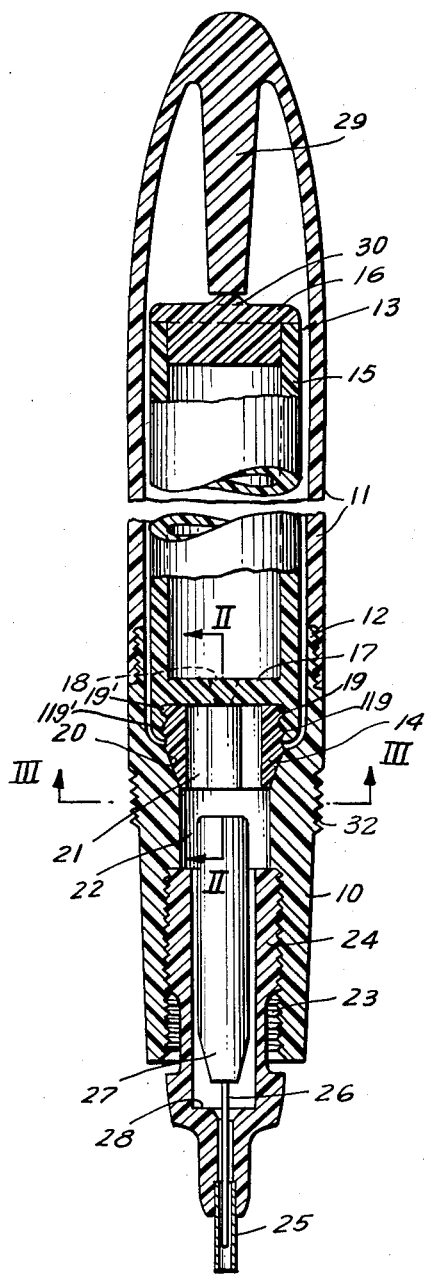
FIG. 1 is a vertical longitudinal axial cross section through one form of the writing implement, with some of its parts seen in elevation.

In observing the various figures it will be noted that FIGS. 1 and 11 disclose similar structures, except that in FIG. 1 the barrel components are removably secured by threads, whereas in FIG. 11 a bayonet connection is provided between the two components. The barrel components in each of the modified forms comprise what may be considered a fixed or lower component 10 and a mobile upper component 11. In FIG. 1 these two components are removably held together by threaded connecting portions 12. Within the hollow barrel components there is removably placed a cartridge 13 which consists of what may be termed a fixed fluid-dispensing element 14 and a mobile fluid-holding element 15. At the upper end of the latter element there is provided a stopper or closure 16, which is preferably leakproof as it is tightly but removably joined with the upper end of that cartridge element. Spaced a short distance from the lowermost end of the mobile cartridge element there will be seen an abutment wall 17 provided with two apertures 18. Beneath abutment wall 17 at the lower end of mobile cartridge element 15 there is formed an annular pocket or recess 19 into which snugly fits the annular upper projection 19' of fixed fluid-dispensing element 14, so that a fluid-tight but operative connection is formed between the two cartridge elements. Obviously, the material from which both elements are made must be both resilient and tough, which properties would be found in plastics similar to polyethylene.

It is to be noted that the connection between the interior surface of annular recess 19 and the exterior surface of annular propection 19' of fixed element 14 must not only be leakproof but is designed to forcibly urge the top face of fixed element 14 against the lower face of abutment wall 17. Beneath annular recess 19 of the cartridge there will be seen two oppositely disposed depressions 119, there being four such depressions spaced at ninety degrees. Engaged by these depressions are projections 119', seen in section in FIGS. 1, 2, 4, 5, 7 and 14, and shown in elevation in FIGS. 8 and 11, there being four such projections, also spaced at ninety degrees from each other. It will be also noted that the lower portion of dispensing element 14 is conoidal and is adapted to engage a similar conoidal seat 20 within lower or fixed barrel component 10. Obviously, the connection between element 14 and component 10 must be such as to provide a fluid-tight seal between the two items.

Figure 2:
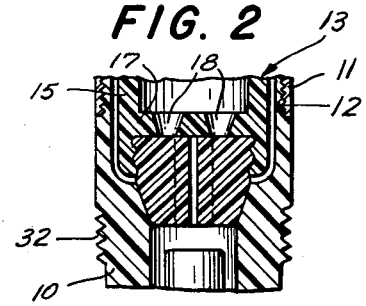
FIG. 2 is a fragmental vertical cross section taken along lines II—II of FIG. 1.
Figure 3:
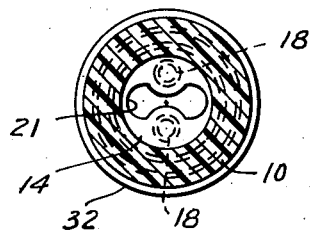
FIG. 3 is a horizontal cross section taken along lines III—III of FG. 1.

As shown in FIGS. 1, 2 and 3, element 14 is provided with a through passage 21 issuing into a chamber 22 propressions 119 serves for correctly positioning through passage 21 of element 14 in respect to apertures 18 of the cartridge abutment wall 17, since, as stated, there are four projections and four depressions disposed at right angles to one another. Below chamber 22 it will be seen vided in lower barrel component 10. The cooperation between the above-mentioned projections 119' and deweight 27. Fluid guide 26 and weight 27 can move with that component 10 is threaded internally as at 23 to accommodate an externally threaded hollow nib 24, at the lowermost end of which is mounted a tubular writing instrument or pen 25. Extending into that tubular pen is a fluid guide in the form of a wire 26 attached to a in hollow nib 24 in axial direction, but its movement is limited by the bottom 28 of the hollow portion of the nib and by the lower end of dispensing element 14, or by other abutment means as will be explained presently. Fluid guide 26 and its weight 27 have for their purpose to clear the passage through writing tube 25 in case any writing fluid should congeal therein.

As stated, it is proposed that the mobile element 15 of the cartridge is to be movable relative to the fixed fluid-dispensing element 14, which is fixedly held in the lower barrel component 10 of the device. In FIG. 1 it will be seen that mobile component 11 of the barrel is provided with an internal extension 29 and that cartridge stopper or closure 16 is provided with an upward projection 30 adapted to be engaged by extension 29. It is intended that cartridge 13 be tensionally held within the barrel, that is between its two components.

The operative closure or valve of the cartridge is composed of apertured abutment wall 17 of the fluid-holding, mobile cartridge element 15 and fluid-dispensing element 14 with its through passage 21. When the two cartridge elements are placed in the position shown in FIGS. 1, 2 and 3, liquid contained within element 15 is prevented from leaving the cartridge. When now cartridge element 15 is rotated so that its apertures 18 partly or fully register with through passage 21 of fixed element 14, fluid will pass into chamber 22 and from there along fluid guide 26 into pen or writing tube 25.

Rotation of cartridge element 15 shown in FIG. 1 is effected by hand after removal of upper barrel component 11 from lower barrel component 10. In the modification shown in FIG. 11 the turning movement of mobile cartridge element 15 is caused by turning upper barrel component 11' relative to fixed lower barrel component 10', but without disengaging these two barrel components, the frictional engagement between barrel component 10' and cone 14 being sufficient to prevent cone 14 from turning, while cartridge element 15 is being operated.

The general arrangement of the embodiment shown in FIGS. 4, 5 and 6 is very similar to that described in connection with FIGS. 1, 2 and 3, with the exception that fixed barrel component 10 is provided just above chamber 22' with an abutment bridge 31 for weight 27. Thus the upward movement of this weight is limited by that bridge. Obviously the shape of the fluid-dispensing element 14' is somewhat altered to accommodate bridge 31, as clearly seen in FIG. 5; however the fluid-tight connection between the tapered lower part of cartridge element 14' and the correspondingly tapered seat for the latter provided in barrel component 10 is similar to that shown in FIGS. 1 to 3.

In observing FIGS. 1, 2, 4 and 5 it will be noted that the fixed barrel component 10 is provided with an external thread 32 which is intended to accommodate a cap for covering tube 25 when the implement is not in use. Such cap is not shown since its structure and application are obvious.

The modified form of the device illustrated in FIGS. 7 to 10 again provides a lower fixed barrel component 10 and upper mobile barrel component 11, both components being removably joined by means of corresponding threads 12. A somewhat different arrangement is provided at the connecting portions between fixed barrel component 10 and fixed fluid-dispensing cartridge element 14''. The latter is connected with the fluid-holding element 15 in a similar manner as seen in FIGS. 1 and 4. The altered connection between barrel component 10 and fluid-dispensing element 14'' provides for the latter a circumferential rim 33, from which extend downwardly lugs 34. These lugs are adapted to fit into and interlock with corresponding pockets 35 provided in fixed barrel component 10, see FIGS. 7, 8 and 9. Thus fluid-dispensing element 14'' is positively held against rotation, when fluid-holding element 15 is turned. Referring to FIGS. 7, 8 and 10, there is also provided a modified form of an abutment for weight 27 in the form of a cross 36 shown clearly in FIG. 10 and forming an integral part of barrel component 10. Projections 34 of fluid-dispensing element 14'' and pockets 35 within fixed barrel component 10 can be clearly observed in FIG. 9. A suitable gasket 35' seals element 14'' against barrel element 10.

FIGS. 11 to 13 disclose another modified form of the present device. In FIG. 11 numeral 10' denotes again the lower or fixed barrel component, while numeral 11' indicates the upper or mobile barrel component. The disengageable connection between the two components is in the form of a bayonet slot 37 in one of the components and corresponding lugs extending into the slot from the other component. As seen in FIG. 13 slots 37 are provided in the fixed component 10' and lugs 38 extend into the slot from the mobile component 11'. This mobile component has an internal projection 39, see FIGS. 11 and 12.

Mobile cartridge element 15 is provided with an end stopper 16' in which is provided a cross slot 40. Extension 39 of the mobile barrel component is intended to engage the slot as seen in FIGS. 11 and 12, whereby mobile cartridge element 15 may be turned so as to either close or open the passage provided in lower or fixed cartridge element 14.

The bayonet connection between barrel elements 10' and 11' is so arranged in respect to the passages in the cartridge elements that the turning of element 15 by barrel component 11' for either closing or opening of the passages in cartridge element 14 will not disconnect the two barrel components.

In every other respect the construction shown in FIG. 11 is similar to that shown in FIG. 1, with the exception that the connection between the two barrel components is effected by a bayonet arrangement, instead of by threads.

Figure 14:
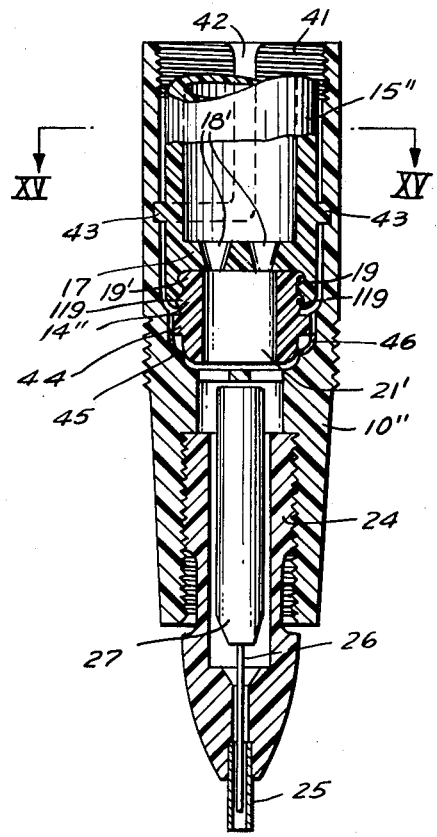
FIG. 14 illustrates in vertical section still another modified form of the lower portion of the device wherein a sealing gasket is employed between the lower fixed component of the barrel and the fixed element of the cartridge, and a bayonet locking arrangement for the mobile cartridge element.
Figure 15:
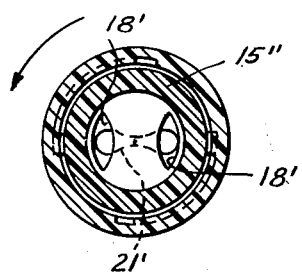
FIG. 15 is a horizontal section taken along lines XV—XV of FIG. 14.

Considering now the modification shown in FIGS. 14 and 15, there is disclosed only the fixed barrel component 10" which is provided at its upper end with an internal thread 41 for the reception of an externally threaded mobile component, not shown. There is also disclosed in FIG. 14 only a portion of fluid-holding cartridge element 15". It will be noted that barrel component 10" is provided at its interior cylindrical face with bayonet slots 42, only one being shown, and that from cartridge element 15" extend lugs 43 adapted to operate within two oppositely disposed bayonet slots such as slot 42. Obviously this modified structure requires that in order to operate the cartridge closure, the upper mobile barrel component must be first removed to render fluid-holding cartridge element 15" accessible for operation, while the fixed fluid-dispensing element 14" is again held against movement by a plurality of lugs 44 seated in corresponding pockets 45. In order to assure leakproof sealing between element 14" and barrel component 10" there is provided a gasket 46, as indicated in FIG. 14. This illustration shows cartridge element 15" in a position wherein apertures 18' of abutment wall 17 partly register through passage 21' of fluid-dispensing element 14", thus causing fluid to pass towards pen point 25.

As stated above, in order to permit fluid to pass from element 15" through element 14", the mobile barrel component (not shown) must be first removed, whereupon fluid-holding element 15" can be turned in respect to fixed cartridge element 14", that is lugs 43 of element 15" will move in a horizontal plane within the horizontal portions of the bayonet slots 42. Before the cartridge can be removed from the lower barrel component 10", cartridge element 15" must be positioned so that its lugs 43 enter the vertical portion of bayonet slots 42, whereupon the cartridge is moved upwardly and out of barrel component 10".

The embodiment explained in connection with FIGS. 14, 15 has for its purpose to assure leak-sealing of the cartridge before it can be removed from the barrel. The arrow in FIG. 15 indicates the direction at which cartridge element 15" is turned after its lugs 43 have passed through the vertical bayonet slot portions. That turning motion releases fluid from the cartridge. Before the cartridge can be removed, it must be first turned in a direction opposite to that indicated by the arrow, whereby the cartridge closure is closed. In other words, before the cartridge leaves the barrel it is rendered leakproof.

While the foregoing description of the different contemplated structures of the present invention is more or less specific to the illustrations disclosed, changes and modifications may become necessary and unavoidable in the production of the present writing implement, such unavoidable changes and modifications, provided that they are made within the scope of the annexed claims, are deemed to form part and parcel of the present invention.

What is claimed as new is:

1. In a writing implement, a fountain pen structure having a replaceable fluid-carrying cartridge, a removable, but normally tightly fitting closure for the upper cartridge end, a hollow fountain pen barrel composed of two normally interconnected but separable components, one being a fixed component having means for accommodating exchangeable writing instrumentalities, the other component being mobile relative to the fixed component, said cartridge being held within the barrel and comprising two cooperating elements, one being a fluid-holding, operative element, having a closure for its upper end and a perforated abutment wall at its lower end, the other element being immobile and serving as fluid-dispensing element, provided with a through passage, said latter element being firmly seated in the fixed barrel component to effect a leakproof and immovable connection therewith, a writing instrumentality removably associated with the lowermost end of the fixed barrel component, the interior end of said instrumentality being located below said fluid-dispensing element, said operative cartridge element being rotatable relative to said firmly held fluid-dispensing element, the latter's through passage being directed toward said writing instrumentality, the upper end of the fluid-dispensing element engaging the abutment wall of said fluid-holding element, said closure for the upper cartridge end having means for facilitating turning of the cartridge to effect either dispensing or stopping the flow of fluid to the writing instrumentality by way of the cooperation between the perforated abutment wall and the through passage of the fluid-dispensing element.

2. In a writing implement according to claim 1, and wherein the entire cartridge is forcibly held at its ends within the barrel between the separable barrel components, and wherein the mobile barrel component and the mobile fluid-holding cartridge element are provided with cooperating engaging means to effect a rotary movement of said fluid-holding cartridge element when said mobile barrel component is rotated, but without causing disconnection of the two barrel components.

3. In a writing implement according to claim 2 and wherein the lower end of said fluid-dispensing cartridge element has an abutment wall provided with perforations, said abutment wall being forcibly urged into intimate contact with said fluid-dispensing element and said abutment wall with its perforations constituting the operative closure for the cartridge.

4. In a writing implement according to claim 3, and wherein between the engaging surfaces of said fluid-dispensing cartridge element and of said fixed barrel component a resilient sealing gasket is provided.

5. In a writing implement having a barrel composed of two separable components, a replaceable fluid-holding cartridge within said barrel and being provided with an operable closure, the latter being adapted to facilitate either the discharge of fluid from or its retention within said cartridge, said cartridge consisting of two operatively interconnected elements, one being fixedly held in one of the barrel components and therefore constituting an immovable fluid-dispensing element, the other being a mobile fluid-holding element rotatable in respect to the fixed element; said mobile element comprising a cylinder, a removable stopper closing the upper end thereof, an abutment wall, provided with apertures, disposed spaced a short distance from the other end, a recess formed adjacent to said abutment wall, said fixed fluid-dispensing element disposed within said recess and forcibly bearing with its upper or inner face against said abutment wall, a through passage for fluid provided in said fixed element, means provided at the inner face of said recess and at the outer surface of said fixed element to effect leakproof connection between the two cartridge elements, while permitting the movement of the mobile element relative to the fixed element, the apertures in the abutment wall of the mobile element and the through passage of said fixed element being so disposed that when the mobile element is turned to a certain position relative to the fixed element, the apertures in said abutment wall will either partly or fully register with said through passage in said fixed element, thus effecting flow of liquid through that passage, and when said mobile element is turned to another position, so that the full face of the abutment wall covers said through passage, the flow of liquid will stop.

6. In a writing implement according to claim 1 and wherein the upper end closure for said fluid-holding element is a removable stopper having engageable means at its upper end, and wherein said mobile component of the barrel possesses an interior projection operatively engaging the engageable means of said stopper, thus facilitating imparting rotary movement to the fluid-holding cartridge element by turning said mobile barrel component, while both barrel components remain connected.

7. In a writing implement of the fountain pen type having a replaceable fluid-holding cartridge equipped with fluid-flow control means, a hollow barrel comprising relatively movable, detachably connected upper and lower components, the upper component being mobile, the lower component being termed a fixed component, the latter being threaded internally, an exchangeable writing device, threaded externally, placed into said fixed barrel component and comprising a hollow body, a tubular pen point at the outer end thereof, a fluid guide passing into said pen point and having a weight adapted for movement within said hollow body and extending beyond the interior end of the latter, said fluid guide and its weight being movable axially within the device and relative to said pen point, an abutment for the interior end of said weight provided within said fixed barrel component for limiting the inward movement of said weight and of said fluid guide; said cartridge comprising two operatively and fluid-tightly interconnected elements adapted for a limited rotary movement relative to one another, one of the elements being a fluid-holding element and being mobile, the other element being a fluid-dispensing element and being fluid-tightly but removably seated within said fixed barrel component and being located above said writing device, said fluid-holding cartridge element comprising a cylinder, a stopper removably but tightly associated with its upper or inner end, an abutment wall provided with perforations located somewhat distanced from the lowermost end of the cylinder, a pocket or recess formation adjacent to said abutment wall, said fluid-dispensing element extending with its upper end into said recess formation whereby a connection between the two cartridge elements is formed, said fluid-dispensing element having a through passage directed toward said writing device, both cartridge elements being made from resilient, but tough and substantially firm material so that their connection within the said recesses at the lower end of said fluid-holding cartridge element is maintained in fluid-tight condition during movement of said element; said abutment wall with its perforations and said fluid-dispensing element with its through passage constituting fluid-flow control means for the cartridge; the mobile element of said cartridge and the mobile component of said barrel having cooperating engaging means whereby a movement of said mobile component is imparted to the mobile fluid-holding cartridge element for either bringing into registry the perforations in the abutment wall with the through passage of said fluid-dispensing element to effect flow of fluid to said writing device, or to prevent such flow by covering said through-passage with a solid portion of the abutment wall.

8. In a writing implement according to claim 7, and wherein the connection for said barrel components constitutes internal and external interengaged thread areas.

9. In a writing implement according to claim 7, and wherein the connection between said barrel components comprises at least one set of grooves composed of continuous axial and peripheral portions provided in one of the components, and at least one projection at the other component cooperating with said groove set, the length of the peripheral groove portion limiting the movement of said mobile barrel component, and thus limiting the rotary movement of the fluid-holding cartridge element.

10. In a writing implement according to claim 7, and wherein said abutment for said fluid guide weight is in the form of a bar located beneath the fluid-dispension element of said cartridge, said bar forming an integral part of said fixed barrel component.

11. In a writing implement according to claim 7, and wherein said abutment for said fluid guide weight is in the form of a cross located beneath said fluid-dispensing cartridge element and forming an integral part of said fixed barrel component.

References Cited in the file of this patent

UNITED STATES PATENTS

| | | |
|---|---|---|
| 885,753 | Holland | Apr. 28, 1908 |
| 1,425,150 | Ullrich | Aug. 8, 1922 |
| 1,826,195 | Wooldridge | Oct. 6, 1931 |
| 2,126,540 | Dicks | Aug. 9, 1938 |

FOREIGN PATENTS

| | | |
|---|---|---|
| 145,963 | Germany | Nov. 7, 1903 |